Patented Jan. 15, 1935

1,988,050

UNITED STATES PATENT OFFICE 1,988,050

PROCESS OF PRODUCING POWDERED PHOSPHATIDE PREPARATIONS

Richard Rosenbusch and Gustav Reverey, Steglitz, near Berlin, Germany

No Drawing. Application October 3, 1931, Serial No. 566,804. In Germany October 9, 1930

13 Claims. (Cl. 167—82)

As is known, the phosphatides and particularly lecithin have a wax-like consistency and it is therefore very difficult to administer these substances. Also the further treatment of lecithin and other phosphatides, for instance the mixing with other substances, is connected with great difficulties. It has been proposed to mix the said substances with flour or cocoa, but in this case only small amounts of phosphatides (15–20%) can be mixed with the carrier if it is desired to obtain powderous products. Also lime has been proposed for the same purpose, but in this case lime must be regarded as an undesired inorganic heterogeneous body.

It has now been found, that it is possible to obtain high-percentage, powderous stable products by applying the phosphatides to the germs which are formed at the producing of malt from corn and maize, and particularly to root germs, such as for instance are obtained when producing malt from barley. In this case the phosphatides are preferably dissolved or suspended in a solvent (alcohol, water or the like) and the dried, purified and ground germs are stirred with this fluid, whereupon the solvent is removed in a suitable manner, for instance by vaporization in vacuum. It is also possible to treat the germs with phosphatides which have been soaked in oil and thereupon to remove the oil by treating for instance with acetone. The adhering acetone may then be removed by drying.

The treatment described above is particularly advantageous when the corn germs are extracted with water or an organic solvent before the same are coated with the phosphatides.

By means of the novel process it is possible to obtain preparations containing up to 70% of phosphatides. In spite of the powderous consistency the preparations are less sensible for instance towards humidity than the phosphatides. The increased stableness is especially surprising as to phosphatides and lipoides containing phosphatides which are obtained from the central nervous system, since these substances usually decompose rapidly under the influence of air and light. When phosphatides of this origin are treated in accordance with the present invention stable powderous products are also obtained.

Example 1

7.0 kg of barley malt germs, which have been freed from dust and finely ground are thoroughly extracted with ethyl alcohol of 90% and are thereupon dried. 5.0 kg of this mass are mixed with a solution of 5.0 kg of vegetable phosphatides in about 3.0 kg of low boiling benzene by kneading thoroughly in a kneading machine. The pasty mass is spread in a thin layer and dried in a vacuum drying chamber at 40–45°C. The dried product is powderous and can be sifted. It contains 50% of vegetable phosphatides.

Example 2

600 g of lipoides from brain are liquefied by being heated together with 500 g of alcohol and are thereupon treated together with 400 g of malt germs in the manner set forth in Example 1. The malt germs have previously been freed from dust and ground. After drying in vacuum about 1 kg of a product is obtained which contains about 60% of lipoides.

The products obtained according to the invention are designed for use in medicine as nerve restoratives, etc., and can be used where the lipoides and phosphatides have been heretofore used and in the customary doses. Of course the doses will vary according to the condition prescribed for by the physician.

We claim:—

1. A process of converting phosphatides into powderous phosphatide preparations which comprises adding the phosphatide to a neutral liquid and mixing the same with dried purified and ground germs taken from a group consisting of corn, maize and barley germs, said germs being substantially insoluble in said liquid and then removing said liquid.

2. A process of converting phosphatides into powderous phosphatide preparations which comprises adding the phosphatide to a neutral liquid and mixing the same with dried purified and ground germs taken from a group consisting of corn, maize and barley germs, said germs having been extracted with a solvent and being substantially insoluble in said liquid and then removing said liquid.

3. A process of converting phosphatides into powderous phosphatide preparations which comprises adding the phosphatide to a neutral liquid and mixing the same with dried extracted and ground corn germs which are substantially insoluble in said liquid and then removing said liquid.

4. A process of converting phosphatides into powderous phosphatide preparations which comprises adding the phosphatide to a neutral liquid and mixing the same with dried extracted and ground barley germs which are substantially insoluble in said liquid and then removing said liquid.

5. A process of converting phosphatides into powderous phosphatide preparations which comprises adding the phosphatide to alcohol and mixing the same with dried purified and ground germs taken from a group consisting of corn, maize and barley germs, said germs being substantially insoluble in said alcohol and then removing said alcohol.

6. A process of converting phosphatides into powderous phosphatide preparations which comprises adding the phosphatide to a neutral solvent and then mixing the same with dried purified and ground germs taken from a group consisting of corn, maize and barley germs, said germs being substantially insoluble in said solvent and then removing said solvent.

7. A process of converting phosphatides into powderous phosphatide preparations which comprises adding the phosphatide to benzene and mixing the same with dried, purified and ground germs taken from a group consisting of corn, maize and barley germs, said germs being substantially insoluble in said benzene and then removing said benzene.

8. A process of converting phosphatides into powderous phosphatide preparations which comprises adding the phosphatide to alcohol and mixing the same with dried, extracted and ground corn germs which are substantially insoluble in said alcohol and then removing said alcohol.

9. A process of converting phosphatides into powderous phosphatide preparations which comprises adding the phosphatide to alcohol and mixing the same with dried extracted and ground barley germs which are substantially insoluble in said alcohol and then removing said alcohol.

10. A process of converting phosphatides into powderous phosphatide preparations which comprises adding the phosphatide to benzene and then mixing the same with dried extracted and ground barley germs which are substantially insoluble in said benzene and then removing said benzene.

11. A process of converting phosphatides into powderous phosphatide preparations which comprises adding the phosphatide to benzene and then mixing the same with dried ground barley germs which have been extracted with alcohol and then removing said benzene.

12. A powderous stable phosphatide preparation comprising dried finely ground corn germs having incorporated therewith up to 70% of phosphatides.

13. A powderous stable phosphatide preparation comprising extracted dried finely ground barley germs having incorporated therewith up to 70% of phosphatides.

RICHARD ROSENBUSCH.
GUSTAV REVEREY.